(12) United States Patent
Ohta et al.

(10) Patent No.: US 7,855,816 B2
(45) Date of Patent: Dec. 21, 2010

(54) MOVABLE PART LOCKING JIG AND IMAGE FORMING APPARATUS INCORPORATING SUCH MOVABLE PART LOCKING JIG

(75) Inventors: Yasunori Ohta, Yokohama (JP); Yoshiaki Matsuoka, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 1011 days.

(21) Appl. No.: 11/640,253

(22) Filed: Dec. 18, 2006

(65) Prior Publication Data

US 2007/0139732 A1 Jun. 21, 2007

(30) Foreign Application Priority Data

Dec. 16, 2005 (JP) .............................. 2005-363198
Nov. 16, 2006 (JP) .............................. 2006-310375

(51) Int. Cl.
*H04N 1/04* (2006.01)
(52) U.S. Cl. ........................ 358/498; 358/474; 358/488; 358/1.3
(58) Field of Classification Search ................. 358/498, 358/474, 488, 1.3; 378/178
See application file for complete search history.

(56) References Cited

U.S. PATENT DOCUMENTS

| 3,655,968 | A | * | 4/1972 | Moore et al. ................. 378/178 |
| 4,752,948 | A | * | 6/1988 | MacMahon ................. 378/198 |
| 6,722,783 | B2 | * | 4/2004 | Jackson, Sr. ................. 378/178 |
| 6,893,156 | B2 | * | 5/2005 | Sharpensteen et al. ...... 378/177 |

FOREIGN PATENT DOCUMENTS

JP  2004-184905 A  7/2004

* cited by examiner

*Primary Examiner*—Houshang Safaipour
(74) *Attorney, Agent, or Firm*—Sughrue Mion, PLLC

(57) ABSTRACT

A movable part locking jig is loaded into a cassette loader in a radiation image forming apparatus, and a lever is moved to project casing locking members from opposite side walls of a casing, thereby locking the movable part locking jig in the radiation image forming apparatus. Movable part locking members also projects to be brought into abutment against suction cups disposed near the cassette loader, thereby locking the suction cups. Then, the radiation image forming apparatus is moved to a desired location.

22 Claims, 13 Drawing Sheets

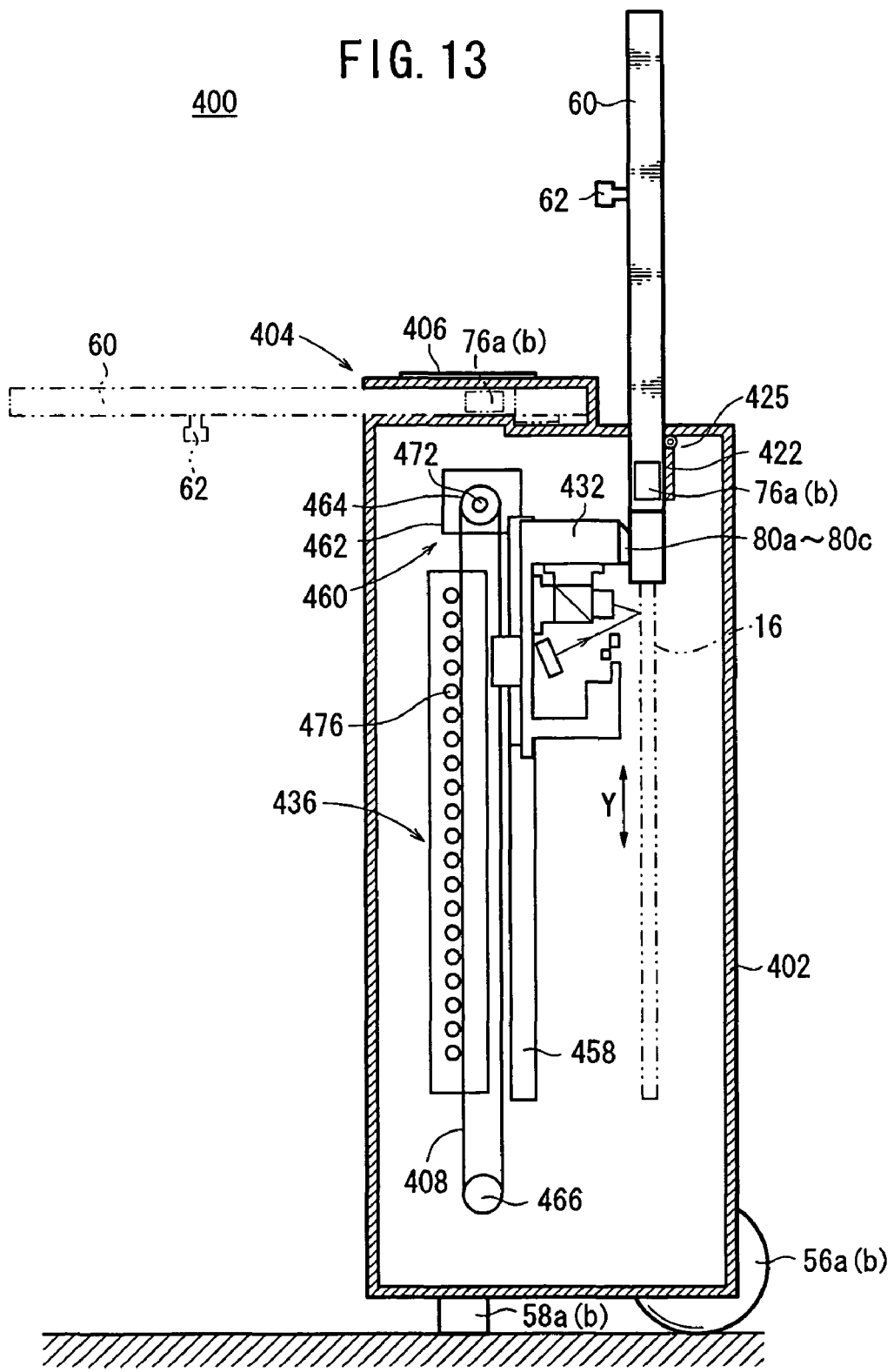

MOVABLE PART LOCKING JIG AND IMAGE FORMING APPARATUS INCORPORATING SUCH MOVABLE PART LOCKING JIG

BACKGROUND OF THE INVENTION

1. Field of the Invention

The present invention relates to a movable part locking jig and a portable image forming apparatus incorporating such a movable part locking jig therein.

2. Description of the Related Art

There has been known in the art an X-ray photographic film for use as an image recording medium for recording radiation image information of a subject such as a human being. There has also been widely used a stimulable phosphor panel instead of the X-ray photographic film. The stimulable phosphor panel has a stimulable phosphor layer which, when exposed to an applied radiation (X-rays, α-rays, β-rays, γ-rays, electron beams, ultraviolet radiation, or the like), stores part of the energy of the radiation, and, when subsequently exposed to stimulating rays such as laser beam or visible light, emits stimulated light in proportion to the stored energy of the radiation.

These image recording mediums are usually handled while being housed in a light-shielded cassette or magazine. The cassette is structured to house a single image recording medium in the form of a sheet therein. The cassette is employed by a system having a cassette-compatible image information reading apparatus (image forming apparatus) comprising a cassette loader for loading a cassette which houses therein an image recording medium with radiation image information recorded therein, a reading unit for reading the radiation image information recorded in the image recording medium removed from the cassette, and an erasing unit for erasing remaining radiation image information from the image recording medium.

If the above image information reading apparatus is small and portable (hereinafter referred to as "mobile image information reading apparatus"), then it may be moved to an image recording site where a subject may be imaged and recorded radiation image information may be read. For example, after a subject is imaged and radiation image information of the subject is recorded in a stimulable phosphor panel, the recorded radiation image information is immediately read and displayed on a display unit for observation in an operation room or the like. Even if a patient has a body region or an afflicted region which is difficult to image properly, the mobile image information reading apparatus may be moved to the patient to capture radiation image information of the patient. After the radiation image information is captured, it may immediately be read for confirming or adjusting image capturing conditions. As a result, the patient can quickly and accurately be diagnosed.

Since the mobile image information reading apparatus is free of installation site limitations, the same image recording and reading operation as the conventional fixed image information reading apparatus can be performed by fewer mobile image information reading apparatus than the conventional fixed image information reading apparatus. Therefore, there are demands for highly efficient mobile image information reading apparatus in hospitals.

When a mobile image information reading apparatus is moved around in a hospital, some vibrations are inevitably applied to the mobile image information reading apparatus. Since the mobile image information reading apparatus is handled in different places, it may be subject to unexpected shocks in certain locations.

If the mobile image information reading apparatus, which is a precision apparatus, undergoes vibrations or shocks, it tends to have mechanical trouble such as loose screws or the like, which may lead to erroneous reading of recorded radiation image information. Such a reading error greatly affects the image quality of the radiation image information. If the applied vibrations or shocks are extremely intensive, then the mobile image information reading apparatus itself fails to operate. As a result, the availability factor of the mobile image information reading apparatus is lowered to the extent that the convenience of the mobile image information reading apparatus is lost, losing its convenience.

For moving the mobile image information reading apparatus, therefore, it is important to take measures to make movable units that require high accuracy resistant to vibrations and shocks, such as a reading unit for scanning and reading an image recording medium and a supply unit having suction cups for attracting and removing an image recording medium from a cassette and supplying the removed image recording medium to the reading unit.

For example, Japanese Laid-Open Patent Publication No. 2004-184905 discloses an image information reading apparatus wherein a clutch brake is coupled to a drive source for moving a reading head as a movable unit. When a main power supply of the image information reading apparatus is turned off, the supply of electric power to the clutch brake is cut off to lock the drive source for thereby preventing the reading head from moving.

However, since the clutch brake is disposed in the image information reading apparatus, the image information reading apparatus is heavy in weight and large in size. Therefore, it is difficult for the disclosed image information reading apparatus to satisfy requirements for small, lightweight mobile image information reading apparatus. In addition, as the reading head is not locked itself, it is not completely free of vibrations and shocks.

The same problems also arise in image information recording apparatus (image forming apparatus) in which an image recording medium such as an X-ray photographic film is supplied to a recording unit and radiation image information is recorded in the image recording medium by the recording unit.

SUMMARY OF THE INVENTION

It is a general object of the present invention to provide a movable part locking jig which is capable of locking a movable part of an image forming apparatus with a simple arrangement without enlarging and weighing jig configuration, and an image forming apparatus incorporating such a movable part locking jig therein.

A major object of the present invention is to provide a movable part locking jig which allows a portable image forming apparatus to be moved reliably without being subjected to vibrations, and an image forming apparatus incorporating such a movable part locking jig therein.

Another object of the present invention is to provide a movable part locking jig which allows a locking jig to be used as a jig for locking a movable part of an image forming apparatus and also to be effectively used as a working table, and an image forming apparatus incorporating such a movable part locking jig therein.

According to the present invention, a movable part locking jig (a supply unit locking jig), instead of an image recording medium, is loaded into a loader in an image forming apparatus, for locking movable parts in the image forming apparatus with a simple arrangement. Since the movable parts are securely locked in position in the image forming apparatus, the image forming apparatus can be moved reliably without trouble. The image forming apparatus, though it has precise mechanisms therein, can be small in size, light in weight, and handled with ease in hospitals or the like.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 13 is a vertical cross-sectional view of a radiation image forming apparatus according to a still further embodiment of the present invention which incorporates a movable part locking jig therein.

DESCRIPTION OF THE PREFERRED EMBODIMENTS

Figure 1:
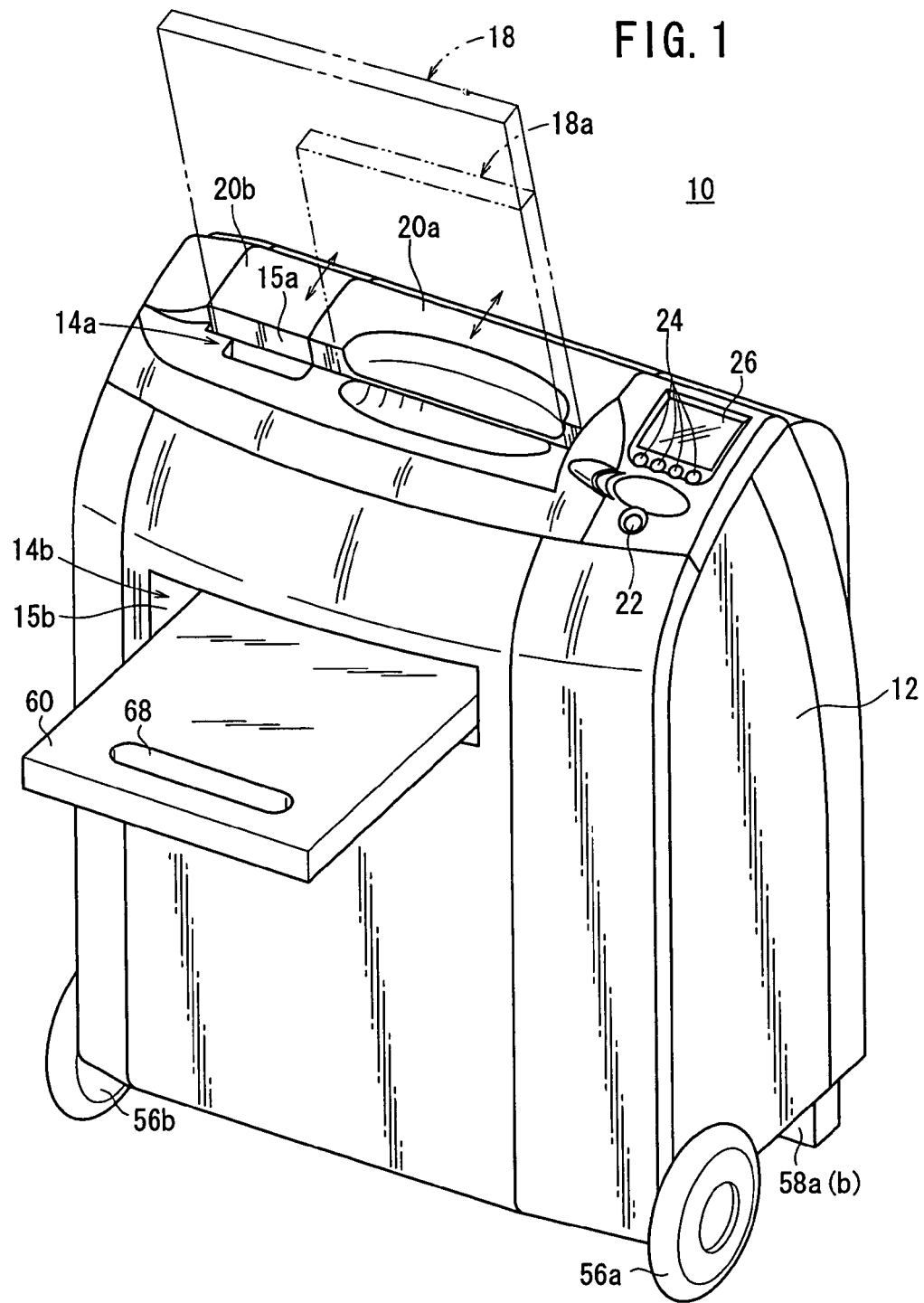
FIG. 1 is a perspective view of a radiation image forming apparatus according to an embodiment of the present invention.
Figure 2:
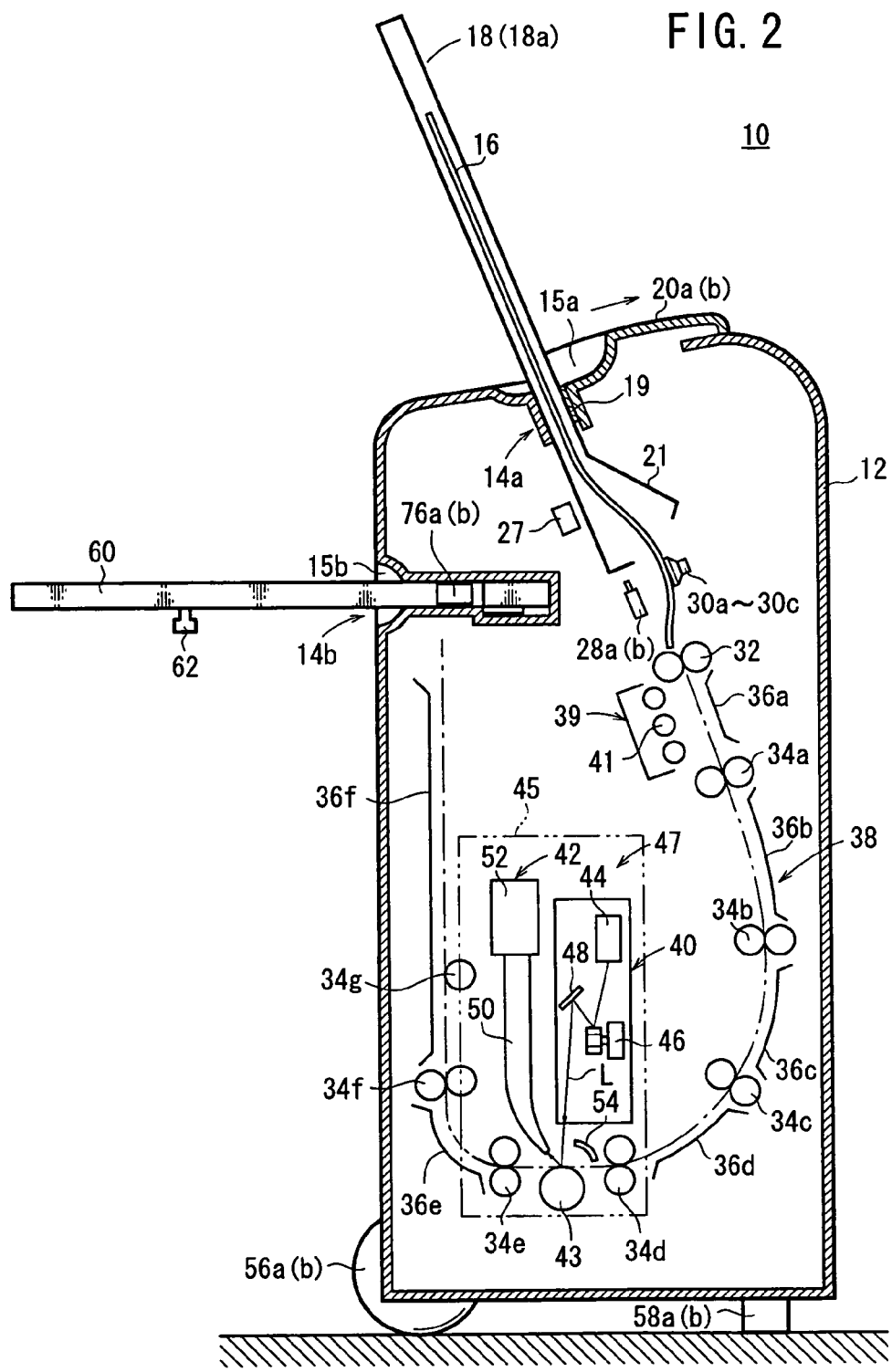
FIG. 2 is a vertical cross-sectional view showing internal structural details of the radiation image forming apparatus shown in FIG. 1.

FIG. 1 shows in perspective a radiation image forming apparatus 10 according to an embodiment of the present invention, and FIG. 2 shows in vertical cross section internal structural details of the radiation image forming apparatus 10.

As shown in FIG. 1, the radiation image forming apparatus 10 has a casing 12 with a cassette loader 14a disposed in an upper wall thereof. The cassette loader 14a has a loading slot 15a into which either a cassette 18 or a cassette 18a housing a stimulable phosphor panel 16 (hereinafter also referred to as "IP") with radiation image information recorded therein is loaded. The cassette 18a is smaller in size than the cassette 18.

The cassette loader 14a has covers 20a, 20b individually displaceable in the directions indicated by the respective allows. When the larger-size cassette 18 is to be loaded, both the covers 20a, 20b are displaced to open the loading slot 15a in its entirety to allow the larger-size cassette 18 to be inserted into the loading slot 15a. When the smaller-size cassette 18a is to be loaded, only the cover 20a is displaced to open a portion of the loading slot 15a to allow the smaller-size cassette 18a to be inserted into the open portion of the loading slot 15a. When the cassette 18 or the cassette 18a is not to be loaded, the covers 20a, 20b close the loading slot 15a to prevent dust and dirt from entering the radiation image forming apparatus 10. When the smaller-size cassette 18a is loaded, because only the cover 20a is displaced and the cover 20b closes the remaining portion of the loading slot 15a, the cover 20b prevents dust and dirt as well as unnecessary external light from entering the radiation image forming apparatus 10 through a wide gap. A power supply button 22, operation buttons 24, and a display panel 26 are mounted on the upper wall of the casing 12 laterally of the cassette loader 14a.

The radiation image forming apparatus 10 has a locking jig loader 14b (locking jig holder) in a front wall of the casing 12. When the radiation image forming apparatus 10 is in operation to process the stimulable phosphor panel 16, a movable part locking jig 60 (supply unit locking jig) can be loaded into a loading slot 15b of the locking jig loader 14b. The movable part locking jig 60 as it is loaded in the loading slot 15b has a flat surface projecting horizontally from the radiation image forming apparatus 10. While the stimulable phosphor panel 16 is being processed, the horizontal flat surface of the movable part locking jig 60 can be used as a working table for placing a patient's medical record thereon for the doctor to note therein. The horizontal flat surface of the movable part locking jig 60 may also be used as a working table for various purposes, e.g., for placing medical instruments or the like temporarily thereon.

Wheels 56a, 56b for moving the radiation image forming apparatus 10 are mounted on respective front bottom corners of the casing 12. Stoppers 58a, 58b are mounted on respective rear bottom corners of the casing 12.

As shown in FIG. 2, a shutter 19 serving as a light shielding means is disposed in the loading slot 15a in the upper wall of the casing 12. The casing 12 accommodates therein, in a region near and below the loading slot 15a, an IP information reader 27 for reading type information (hereinafter referred to as "IP information") representing the size, sensitivity, etc. and the unique number, etc. of the stimulable phosphor panel 16 housed in the loaded cassette 18 or 18a, unlock mechanism 28a, 28b for unlocking a lid 21 of the cassette 18 or 18a, suction cups 30a through 30c serving as a movable part (supply unit) for attracting and removing the stimulable phosphor panel 16 from the cassette 18 or 18a whose lid 21 is open, and a nip roller pair 32 for gripping and feeding the stimulable phosphor panel 16 removed from the cassette 18 or 18a by the suction cups 30a through 30c.

The IP information reader 27 may comprise a reading means such as a bar-code reader, an RFID unit, or the like for reading IP information recorded in a bar code, an IC chip, or the like applied to the cassette 18 or 18a or the stimulable phosphor panel 16.

The movable part locking jig 60 is of substantially the same size as the cassette 18. The movable part locking jig 60 can be loaded into the loading slot 15a.

The nip roller pair 32 is followed by a plurality of feed rollers 34a through 34g and a plurality of guide plates 36a through 36f which extend as a curved feed path 38 in the casing 12. The curved feed path 38 extends downwardly from the cassette loader 14a, lies substantially horizontally in its lowermost area, and then extends upwardly.

Between the nip roller pair 32 and the feed rollers 34a, there is disposed an erasing unit 39 for erasing residual radiation image information from the stimulable phosphor panel 16 from which desired radiation image information has been read. The erasing unit 39 has a plurality of erasing light sources 41 such as cold cathode-ray tubes for emitting emission light.

A platen roller 43 is disposed between the feed rollers 34d, 34e that are disposed in the lowermost area of the curved feed path 38. The platen roller 43 is positioned beneath a scanning unit 47 (image processor) which is accommodated in a housing 45, for reading radiation image information recorded in the stimulable phosphor panel 16.

The scanning unit 47 comprises a stimulating unit 40 for emitting a laser beam L as stimulating light and scanning the stimulable phosphor panel 16 with the laser beam L, and an image information reading unit 42 for reading stimulated light which is emitted from the stimulable phosphor panel 16 by applying the laser beam L and represents the recorded radiation image information.

The stimulating unit 40 comprises a laser oscillator 44 for emitting the laser beam L, a rotating polygon mirror 46 for deflecting the laser beam L along a main scanning direction across the stimulable phosphor panel 16, and a reflecting mirror 48 for reflecting the laser beam L deflected by the rotating polygon mirror 46 to the stimulable phosphor panel 16 which passes over the platen roller 43.

The image information reading unit 42 comprises a light guide 50 having a lower end disposed near the stimulable phosphor panel 16 over the platen roller 43 and a photomultiplier 52 connected to the upper end of the light guide 50 for converting stimulated light emitted from the stimulable phosphor panel 16 into an electric signal. A light collecting mirror 54 for effectively collecting stimulated light emitted from the stimulable phosphor panel 16 is disposed near the lower end of the light guide 50.

Figure 3:
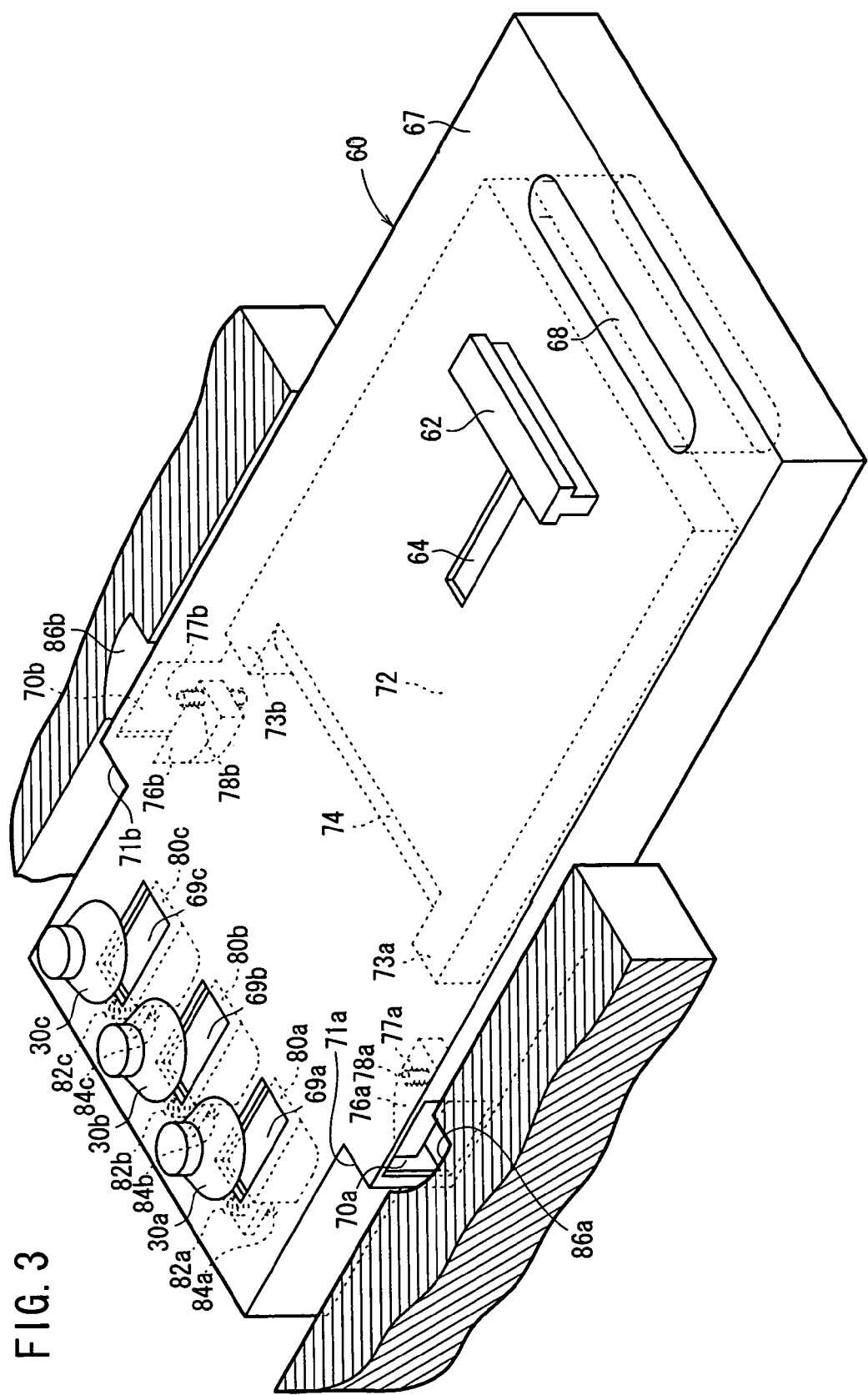
FIG. 3 is a perspective view of a movable part locking jig incorporated in the radiation image forming apparatus shown in FIG. 1.
Figure 4:
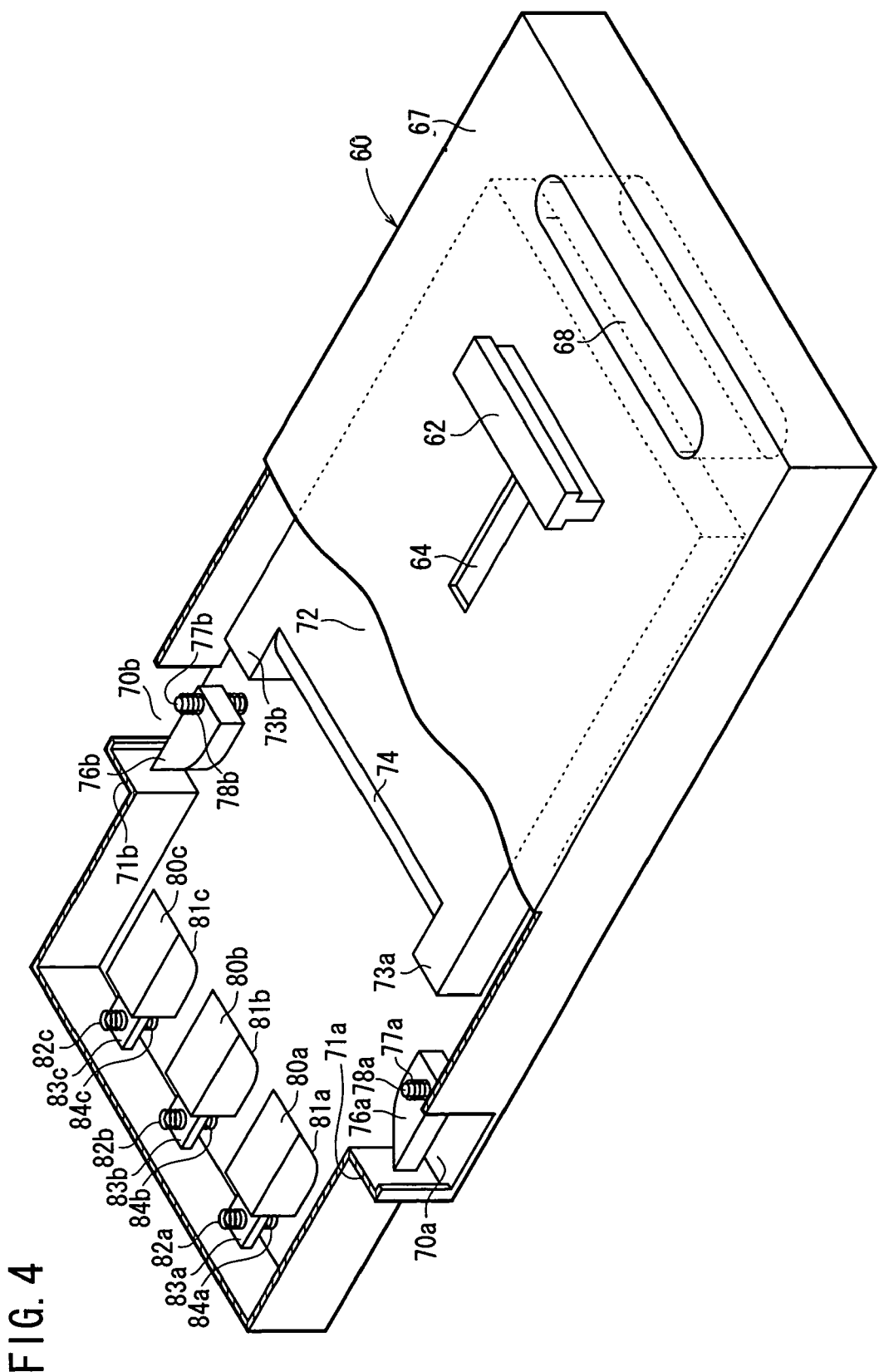
FIG. 4 is a perspective view, partly broken away, showing internal structural details of the movable part locking jig shown in FIG. 3.

FIG. 3 shows in perspective the movable part locking jig 60 which can be loaded in the cassette loader 14a or the locking jig loader 14b. FIG. 4 shows in perspective, partly broken away, internal structural details of the movable part locking jig 60.

The movable part locking jig 60 includes a casing 67 having a grip 68 disposed near one end thereof, a plurality of openings 69a through 69c defined near the other end thereof, and two openings 70a, 70b defined in respective opposite side walls thereof. The wall having the openings 69a through 69c also has a groove 64 defined therein which extends from a position near the grip 68 toward the openings 69a through 69c, and a lever 62 (operating member) movable along the groove 64.

As shown in FIG. 3, the openings 69a through 69c are defined in a portion of the casing 67 which projects to form from steps 71a, 71b. When the movable part locking jig 60 is loaded in the loading slot 15a, the openings 69a through 69c are positionally aligned with the respective suction cups 30a through 30c in the casing 12. When the movable part locking jig 60 is loaded in the loading slot 15a, the openings 70a, 70b are positionally aligned with respective engaging recesses 86a, 86b defined in the casing 12.

The casing 67 houses therein a displacing member 72 connected to the lever 62 and movable from the side of the grip 68 toward the side of the openings 69a through 69c. The displacing member 72 has a tapered first pusher 74 (displacing member tapered surface) on a central portion of the end thereof which faces the openings 69a through 69c, and two second pushers 73a, 73b disposed one on each side of the tapered first pusher 74.

The casing 67 also houses therein a plurality of movable part locking members 80a through 80c (supply unit locking members or image processor locking members) aligned respectively with the openings 69a through 69c for locking the suction cups 30a through 30c, respectively. The movable part locking members 80a through 80c have respective tapered surfaces 81a through 81c (locking member side tapered surfaces) facing the first pusher 74 of the displacing member 72. The movable part locking members 80a through 80c are mounted in the casing 67 by helical springs 82a through 82c and 84a through 84c which are disposed on both surfaces of flanges 83a through 83c of the movable part locking members 80a through 80c. When the first pusher 74 of the displacing member 72 presses the tapered surfaces 81a through 81c, the movable part locking members 80a through 80c project from the casing 67 through the respective openings 69a through 69c.

Two casing locking members 76a, 76b for locking the casing 67 in the radiation image forming apparatus 10 are disposed in the casing 67 in alignment with the respective openings 70a, 70b. The casing locking members 76a, 76b have respective outer off-center portions near the side walls of the casing 67 and pivotally supported in the casing 67 by respective shafts 77a, 77b. Helical springs 78a, 78b are disposed respectively around the shafts 77a, 77b. When the second pushers 73a, 73b of the displacing member 72 press respective inner side portions of the casing locking members 76a, 76b, the casing locking members 76a, 76b are caused to project from the casing 67 through the respective openings 70a, 70b against the bias of the helical springs 78a, 78b.

The radiation image forming apparatus 10 according to the embodiment of the present invention and the movable part locking jig 60 incorporated therein are basically constructed as described above. Operation and advantages of the radiation image forming apparatus 10 and the movable part locking jig 60 will be described below.

First, a mode of operation for moving the radiation image forming apparatus 10 to a desired location will be described below.

Figure 5:
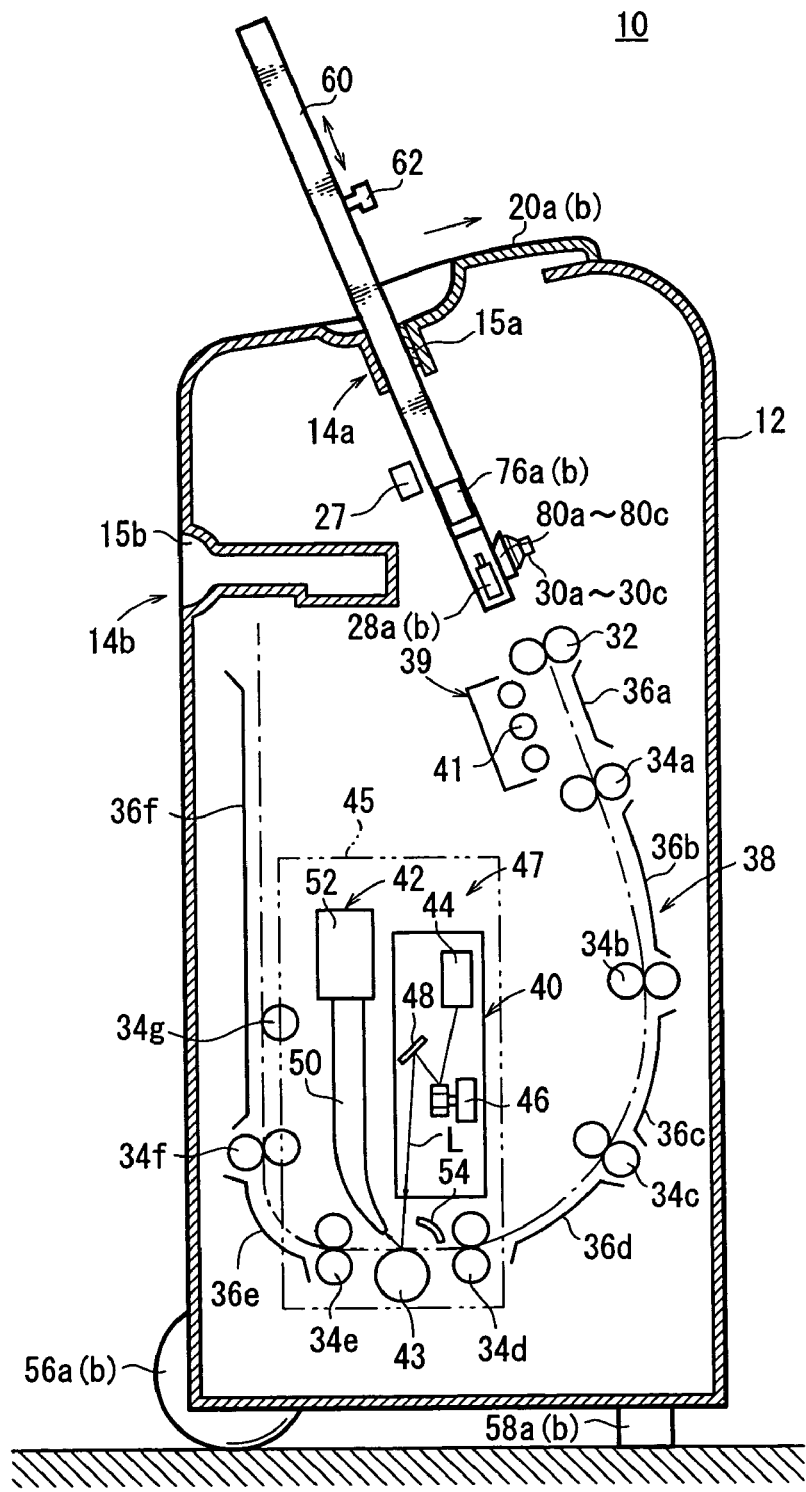
FIG. 5 is a vertical cross-sectional view showing internal structural details of the radiation image forming apparatus which is loaded with the movable part locking jig.
Figure 6:
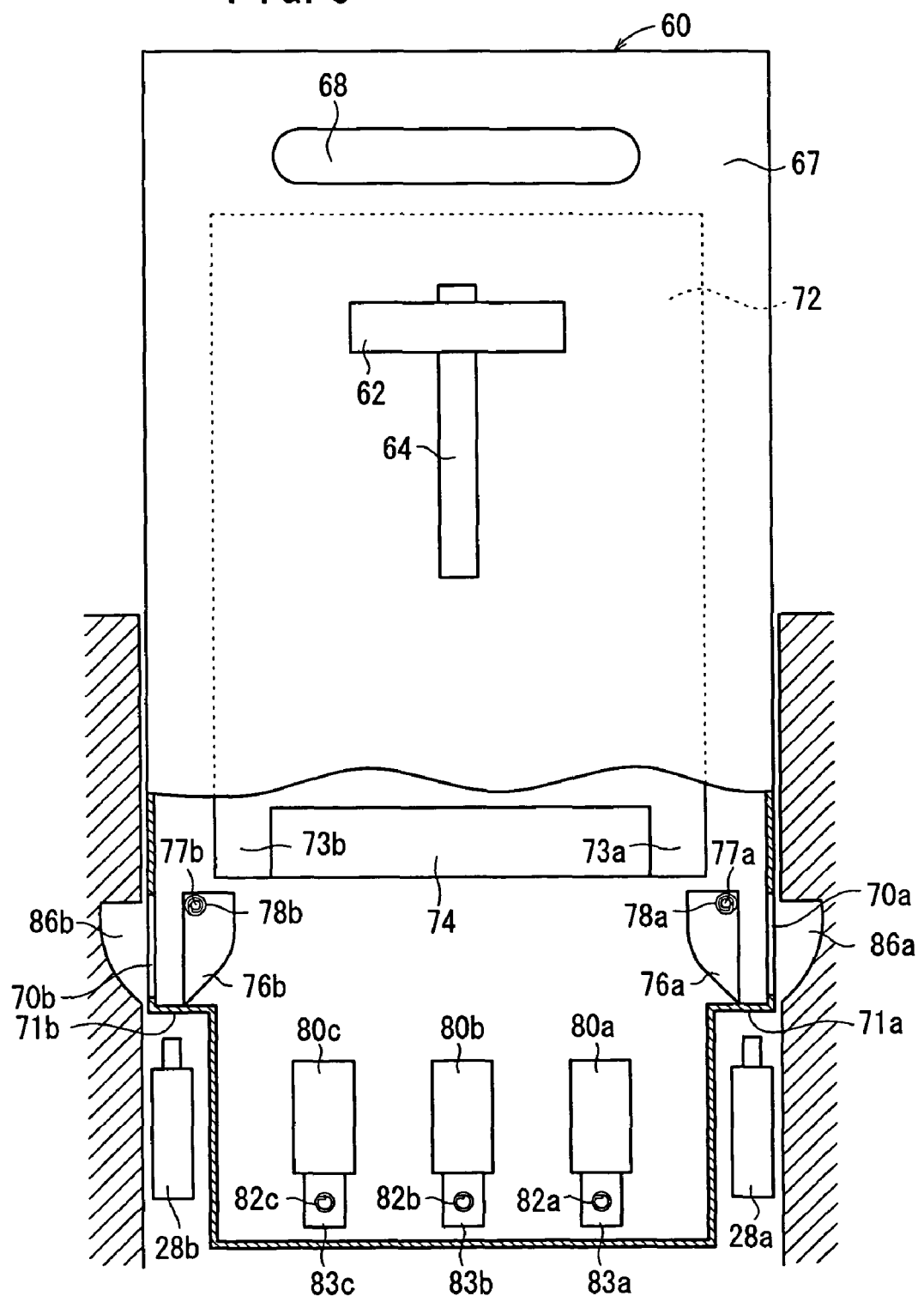
FIG. 6 is an elevational view, partly broken away, of the movable part locking jig immediately after being loaded in the radiation image forming apparatus.

The movable part locking jig 60, instead of the cassette 18 or 18a, is loaded into the loading slot 15a of the radiation image forming apparatus 10. As shown in FIG. 5, the movable part locking jig 60 is loaded into the loading slot 15a with the movable part locking members 80a through 80c ahead. FIG. 6 shows the movable part locking jig 60 immediately after it is loaded in the loading slot 15a. At this time, the unlock mechanisms 28a, 28b disposed in the casing 12 below the loading slot 15a are positioned in front of the respective steps 71a, 71b of the casing 67, and kept out of physical interference with the movable part locking jig 60. The openings 70a, 70b defined in the side walls of the casing 67 are positioned in alignment with the respective engaging recesses 86a, 86b in the casing 12 of the radiation image forming apparatus 10.

Figure 7:
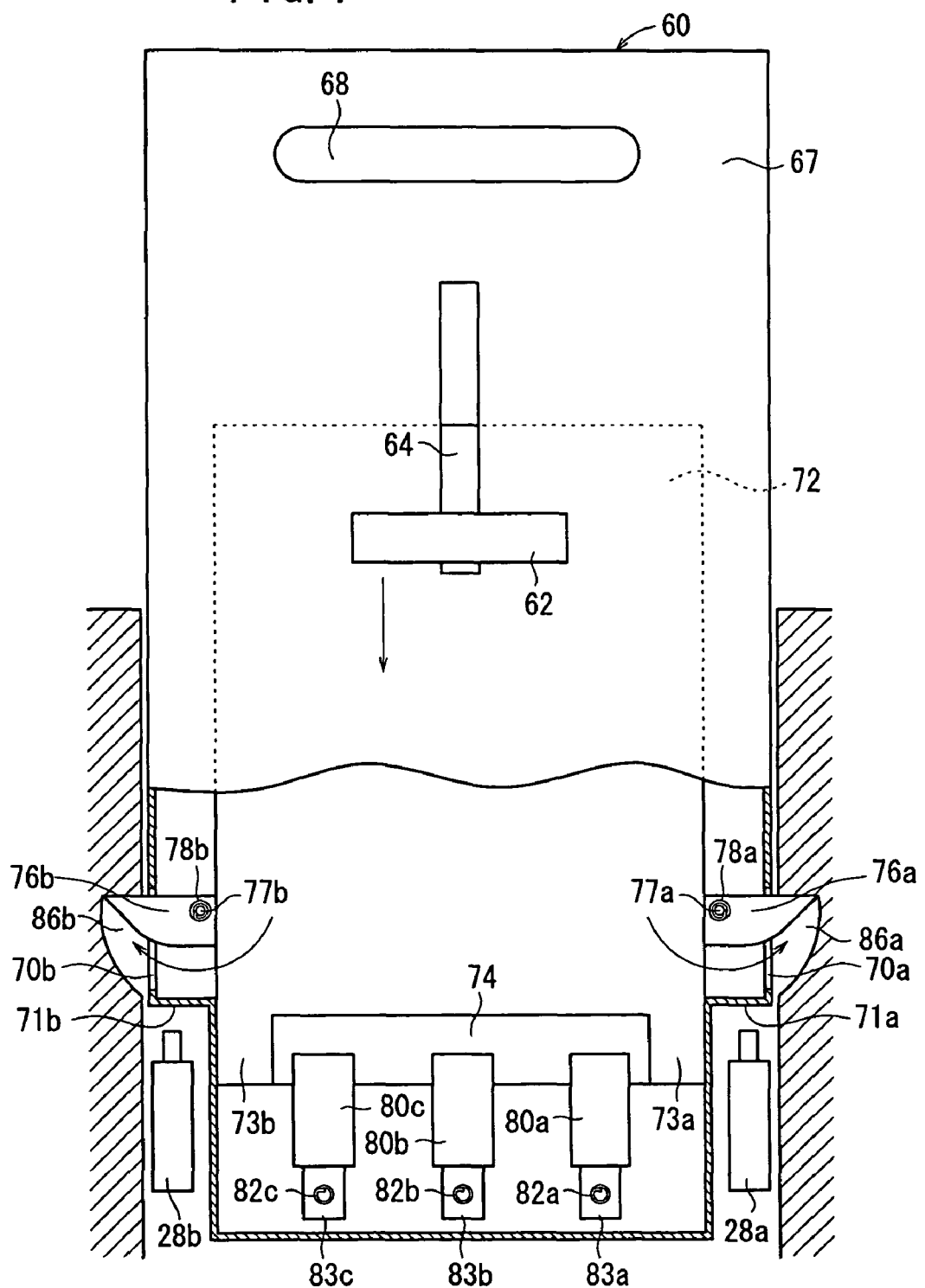
FIG. 7 is an elevational view, partly broken away, of the movable part locking jig which is secured in place in the radiation image forming apparatus.

Then, the lever 62 on the casing 67 which is exposed out of the loading slot 15a is moved toward the loading slot 15a by an operator so that the displacing member 72 coupled to the lever 62 is moved until the second pushers 73a, 73b of the displacing member 72 press the casing locking members 76a, 76b, respectively. At this time, as shown in FIG. 7, the casing locking members 76a, 76b are turned about the shafts 77a, 77b against the bias of the helical springs 78a, 78b and project from the casing 67 through the respective openings 70a, 70b to be engaged with the engaging recesses 86a, 86b. As a result, the movable part locking jig 60 is locked in the radiation image forming apparatus 10.

Figure 8:
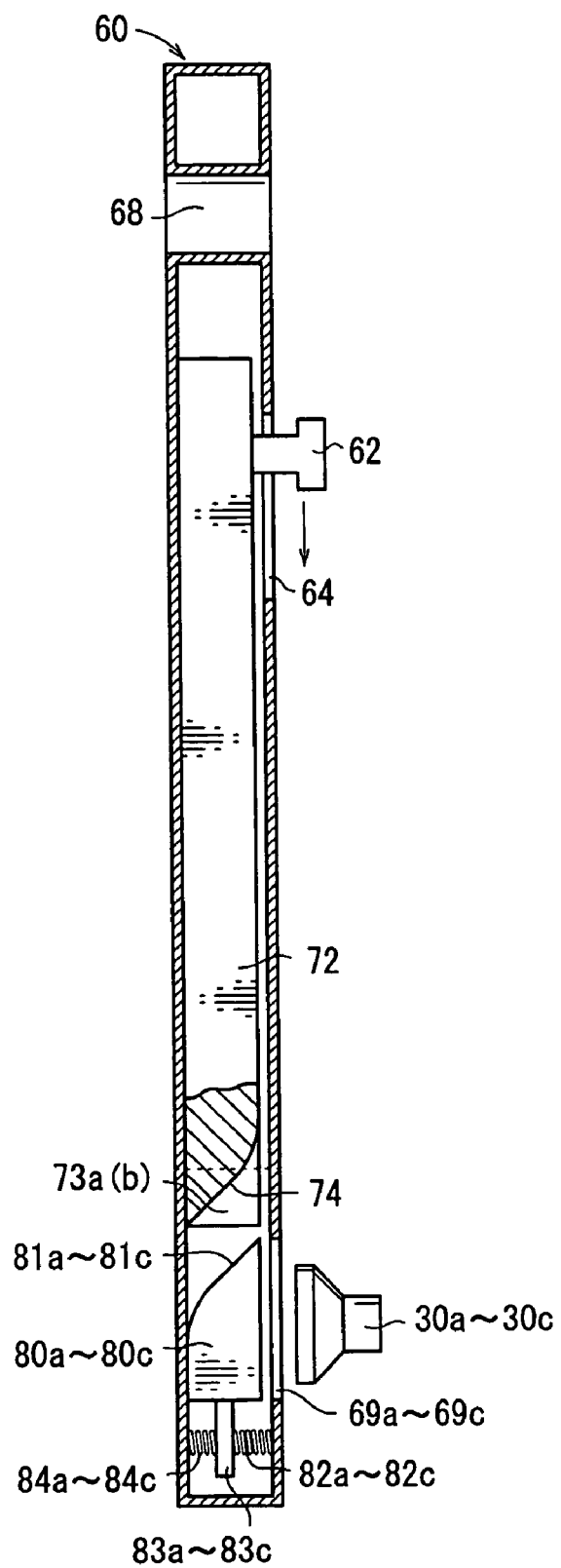
FIG. 8 is a vertical cross-sectional view of the movable part locking jig before a movable part is locked by the movable part locking jig.
Figure 9:
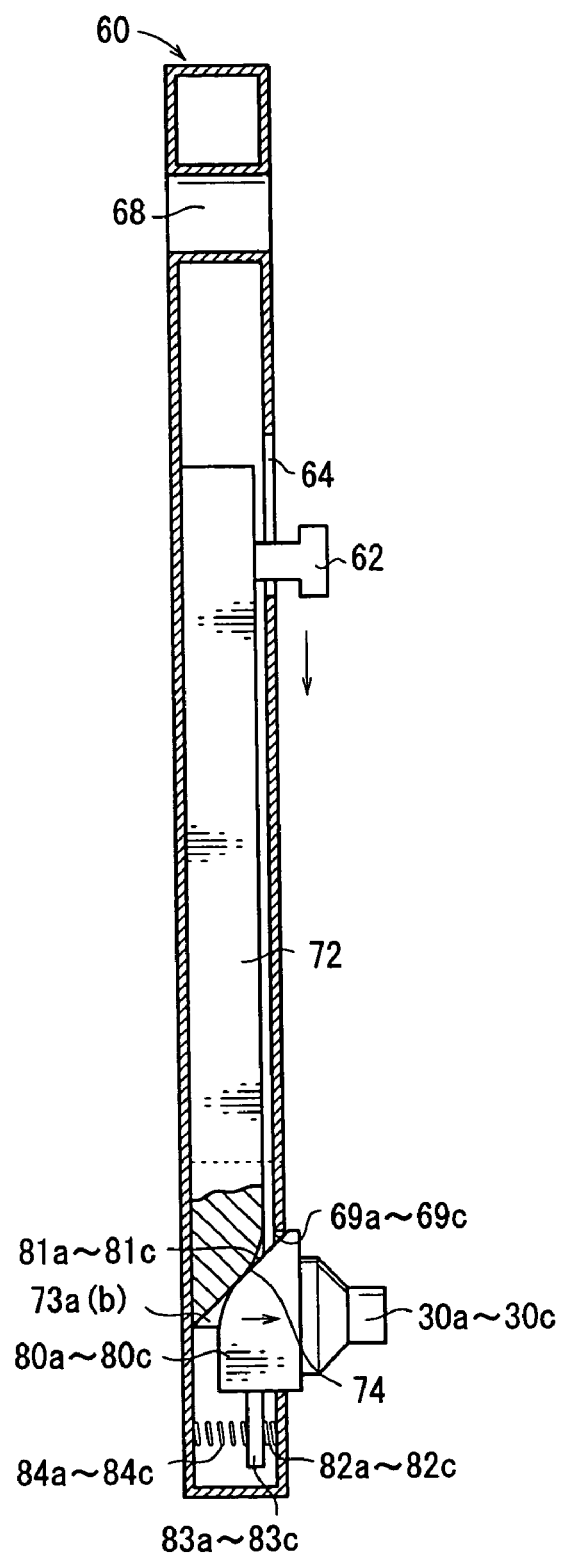
FIG. 9 is a vertical cross-sectional view of the movable part locking jig when the movable part is locked by the movable part locking jig.

When the lever 62 is further moved from the position shown in FIG. 8 toward the direction indicated by the arrow, the tapered first pusher 74 of the displacing member 72 presses the tapered surfaces 81a through 81c of the movable part locking members 80a through 80c to cause the movable part locking members 80a through 80c to project from the casing 67 through the respective openings 69a through 69c (see FIG. 9). At this time, the suction cups 30a through 30c are positioned in alignment with the respective movable part locking members 80a through 80c. Consequently, the movable part locking members 80a through 80c are pressed against the suction cups 30a through 30c, thereby locking the suction cups 30a through 30c against movement.

Figure 10:
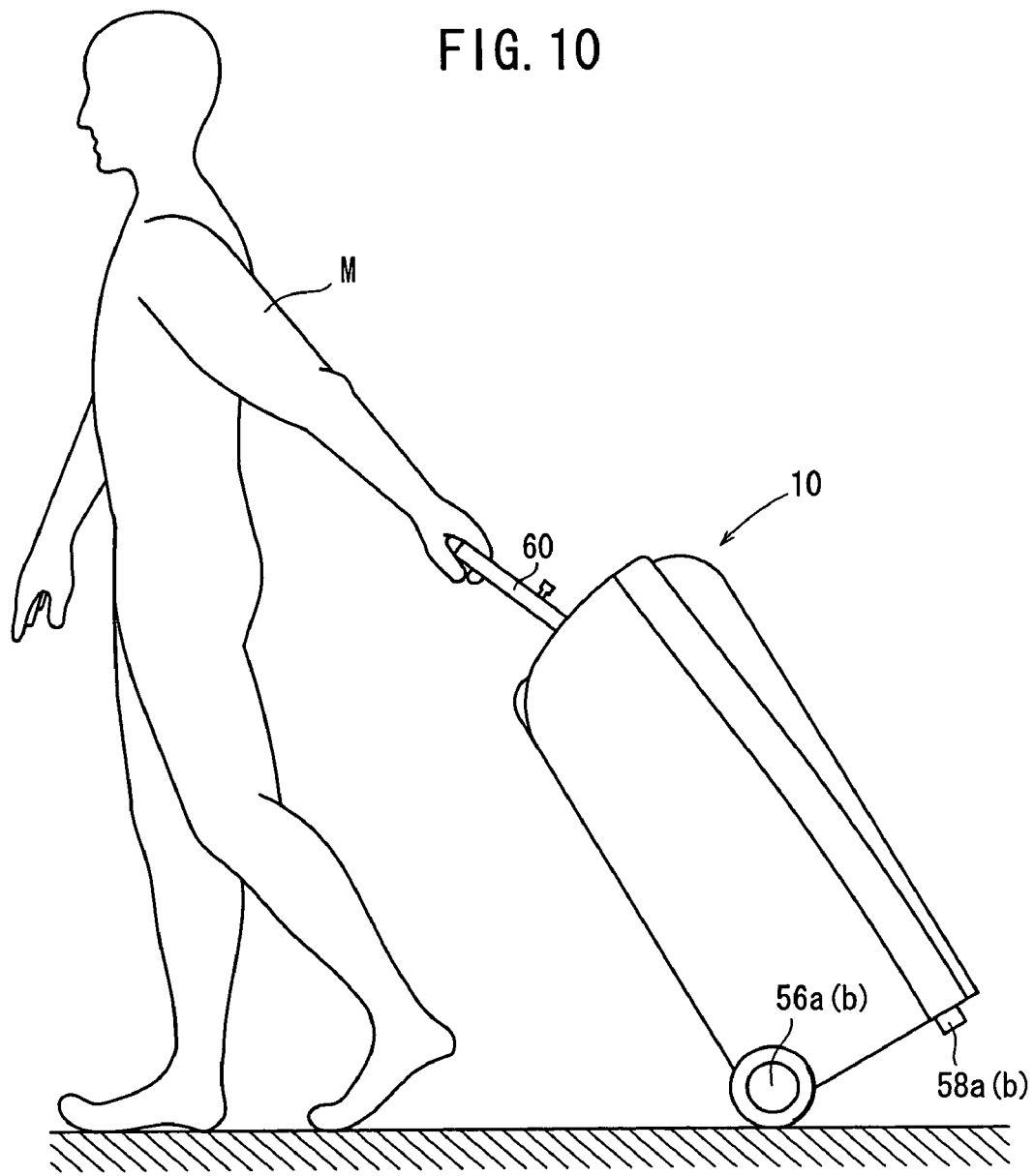
FIG. 10 is an elevational view showing the manner in which the radiation image forming apparatus incorporating the movable part locking jig therein is moved along.

As shown in FIG. 10, the operator M tilts the radiation image forming apparatus 10 so as to be supported by the wheels 56a, 56b only, and pulls the grip 68 in the exposed movable part locking jig 60 to move the radiation image forming apparatus 10 to a desired location. Since the suction cups 30a through 30c as a movable part are locked in position by the movable part locking members 80a through 80c of the movable part locking jig 60, the suction cups 30a through 30c are not adversely affected by vibrations or shocks while the radiation image forming apparatus 10 is in motion. The movable part locking jig 60 is also prevented from being dislodged while the radiation image forming apparatus 10 is in motion because the movable part locking jig 60 is locked in the radiation image forming apparatus 10 with the casing locking members 76a, 76b engaging in the engaging recesses 86a, 86b.

After the radiation image forming apparatus 10 is moved to the desired location, radiation image information is read by the radiation image forming apparatus 10 as follows:

The operator moves the lever 62 toward the grip 68 to displace the first pusher 74 of the displacing member 72 away from the movable part locking members 80a through 80c. The movable part locking members 80a through 80c spring back into the casing 67 under the bias of the helical springs 82a through 82c, thereby unlocking the suction cups 30a through 30c. The second pushers 73a, 73b of the displacing member 72 are also displaced away from the casing locking members 76a, 76b, which then spring back into the casing 67 under the bias of the helical springs 78a, 78b. Thus, the movable part locking jig 60 is unlocked from the radiation image forming apparatus 10.

The operator then removes the movable part locking jig 60 from the loading slot 15a, and loads a cassette 18 or 18a housing therein a stimulable phosphor panel 16 with radiation image information recorded therein into the loading slot 15a.

The removed movable part locking jig 60 is loaded into the front loading slot 15b of the radiation image forming apparatus 10 with the lever 62 facing down. The engaging recesses 86a, 86b shown in FIG. 3 are disposed in the loading slot 15b at respective positions aligned with the casing locking members 76a, 76b of the movable part locking jig 60. When the lever 62 is moved toward the loading slot 15b, the casing locking members 76a, 76b engage respectively with the engaging recesses 86a, 86b, locking the movable part locking jig 60 in the loading slot 15b. The operator such as a doctor or the like may use the flat casing 67 of the movable part locking jig 60 as a working table.

When the cassette 18 or 18a with the stimulable phosphor panel 16 housed therein is loaded in the loading slot 15a, the IP information reader 27 reads IP information representing the type and the unique number, etc. of the stimulable phosphor panel 16 from the cassette 18 or 18a or the stimulable phosphor panel 16.

Then, the unlock mechanisms 28a, 28b unlock the lid 21. When the lid 21 is opened, the suction cups 30a through 30c attract and remove the stimulable phosphor panel 16 from the cassette 18 or 18a. The stimulable phosphor panel 16 is then fed along the curved feed path 38 to a position beneath the image information reading unit 42.

The stimulable phosphor panel 16 fed to the image information reading unit 42 is scanned by the laser beam L emitted from the laser oscillator 44, and emits stimulated light representative of the radiation image information recorded in the stimulable phosphor panel 16. The emitted stimulated light is transmitted through the light guide 50 to the photomultiplier 52, which converts the stimulated light into an electric signal representative of the recorded radiation image information.

After the recorded radiation image information is read from the stimulable phosphor panel 16, the stimulable phosphor panel 16 is fed again along the curved feed path 38 to the erasing unit 39. In the erasing unit 39, the stimulable phosphor panel 16 is irradiated with erasing light from the erasing light sources 41, and residual radiation image information is erased from the stimulable phosphor panel 16 by the applied erasing light. The stimulable phosphor panel 16 is then fed back along the curved feed path 38 and stored back into the cassette 18 or 18a by the suction cups 30a through 30c. Thereafter, the stimulable phosphor panel 16 placed in the cassette 18 or 18a will be used again to record radiation image information therein.

Figure 11:
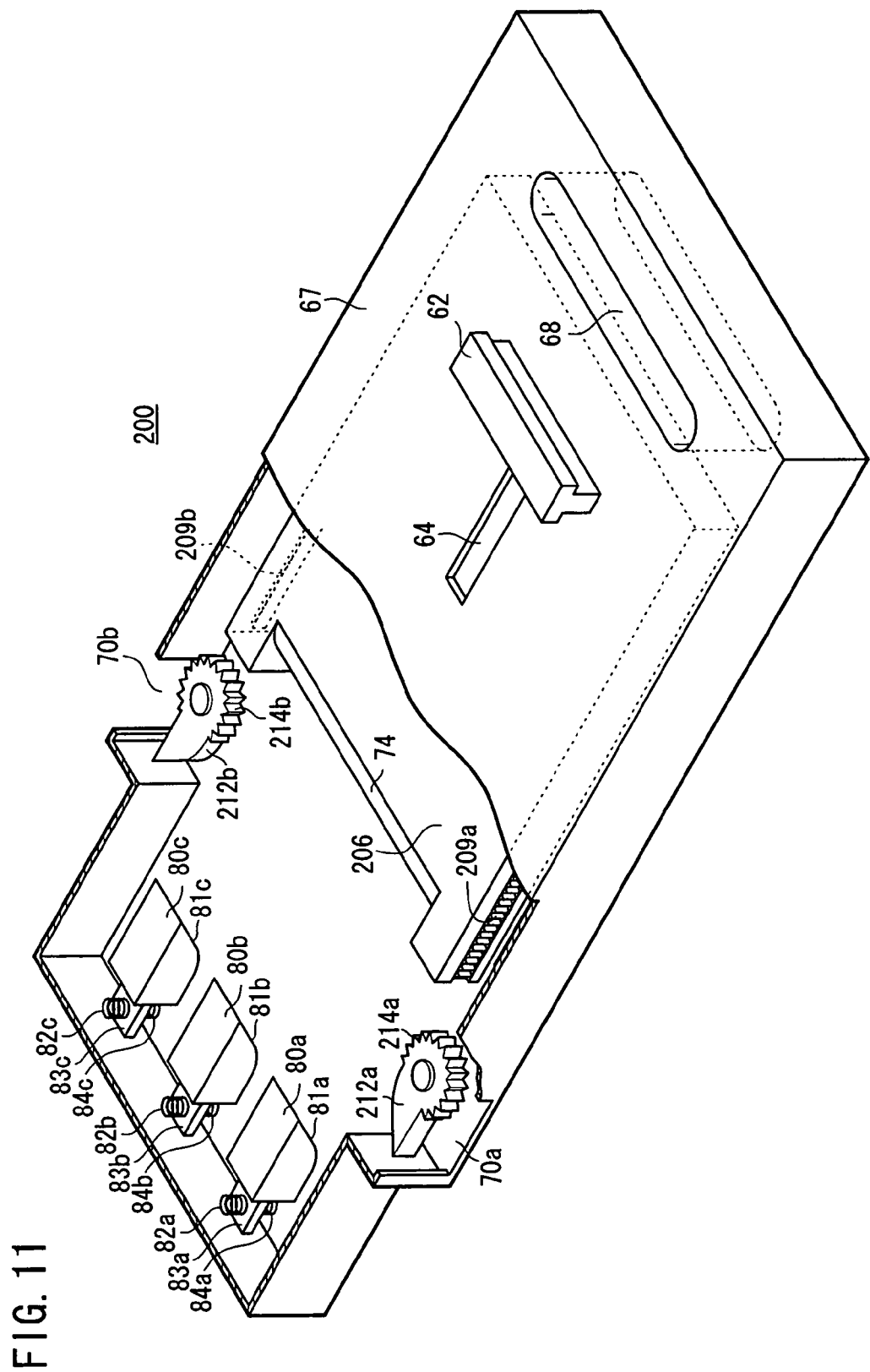
FIG. 11 is a perspective view, partly broken away, showing internal structural details of a movable part locking jig according to another embodiment of the present invention.

FIG. 11 shows in perspective, partly broken away, internal structural details of a movable part locking jig 200 according to another embodiment of the present invention. Those parts of the movable part locking jig 200 which are identical to those of the movable part locking jig 60 are denoted by identical reference characters, and will not be described in detail below.

As shown in FIG. 11, the movable part locking jig 200 has a displacing member 206 disposed in a casing 67. The displacing member 206 has two racks 209a, 209b mounted respectively on side surfaces thereof and extending in the direction in which the displacing member 206 moves. Casing locking members 212a, 212b disposed in the casing 67 in alignment with the respective openings 70a, 70b have respective pinions 214a, 214b for meshing engagement with the respective racks 209a, 209b.

When the lever 62 is moved to displace the displacing member 206, the racks 209a, 209b mesh with the respective pinions 214a, 214b to turn the casing locking members 212a, 212b. The casing locking members 212a, 212b project from the casing 67 through the openings 70a, 70b to lock the movable part locking jig 200 in the radiation image forming apparatus 10.

Figure 12:
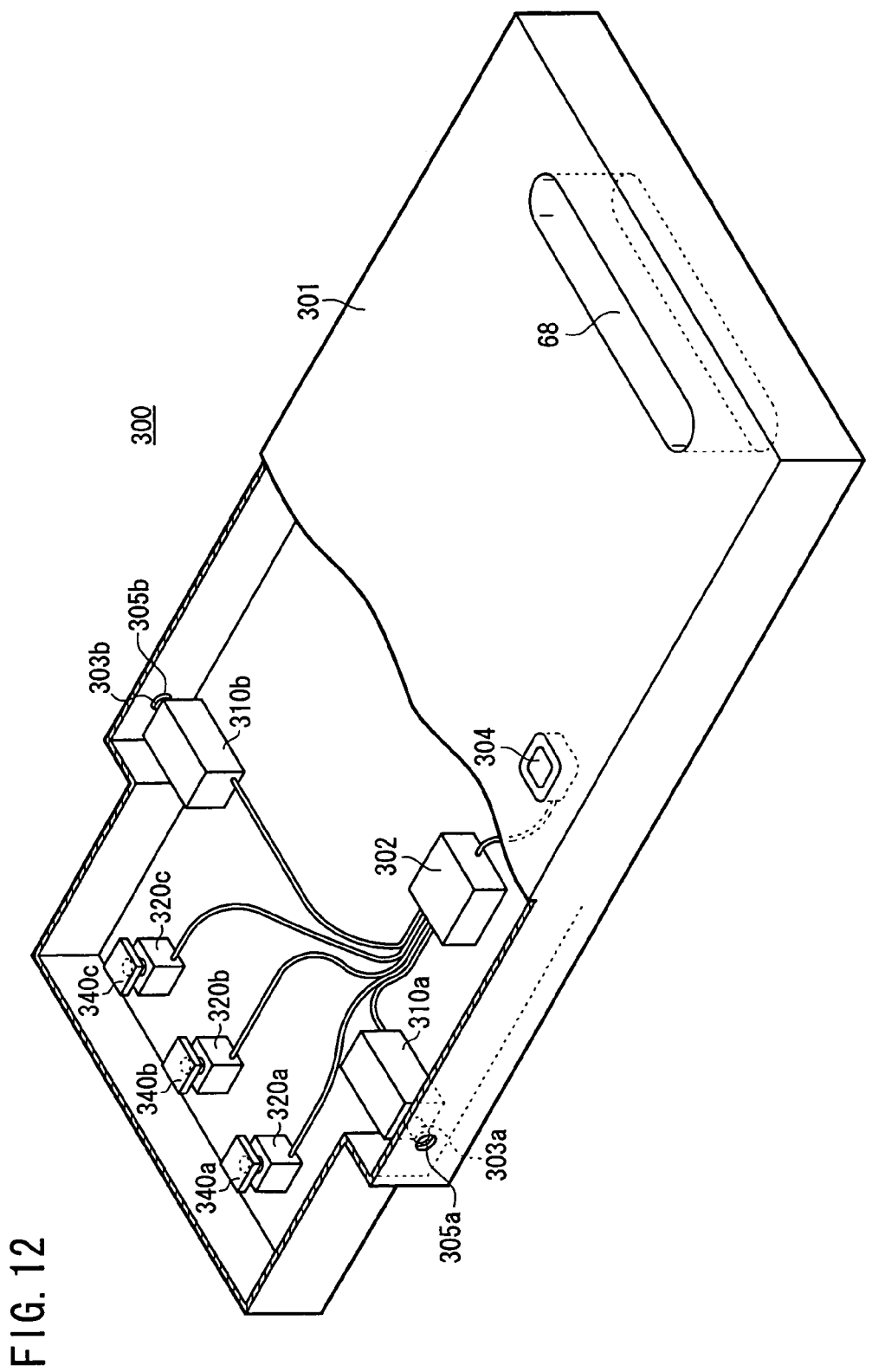
FIG. 12 is a perspective view, partly broken away, showing internal structural details of a movable part locking jig according to a further embodiment of the present invention.

FIG. 12 shows in perspective, partly broken away, internal structural details of a movable part locking jig 300 according to a further embodiment of the present invention.

As shown in FIG. 12, the movable part locking jig 300 has: a casing 301 accommodating therein two solenoid mechanisms 310a, 310b for displacing respective plungers 303a, 303b, serving as casing locking members, to make them project from the casing 301 through respective holes 305a, 305b defined in respective side walls of the casing 301; a plurality of solenoid mechanisms 320a through 320c for displacing respective movable part locking members 340a through 340c to make them project from the casing 301 through respective openings, not shown, defined therein, and a power supply 302 for energizing the solenoid mechanisms 310a, 310b and the solenoid mechanisms 320a through 320c. The power supply 302 is electrically connected to a switch 304 mounted on an upper wall of the casing 301.

When the switch 304 is pressed, the power supply 302 energizes the solenoid mechanisms 310a, 310b to cause the plungers 303a, 303b to project through the holes 305a, 305b into the engaging recesses 86a, 86b in the radiation image forming apparatus 10, and also energizes the solenoid mechanisms 320a through 320c to cause the movable part locking members 340a through 340c to project from the casing 301 into engagement with the respective suction cups 30a through 30c, which are locked in place.

FIG. 13 shows in vertical cross section a radiation image forming apparatus 400 according to a still further embodiment of the present invention which incorporates the movable part locking jig 60 therein, the radiation image forming apparatus 400 having a reading head 432 (image processor) as a movable part.

As shown in FIG. 13, the reading head 432 movably engages a vertical guide rail 458 disposed in a casing 402. The reading head 432 can be actuated by a moving means 460 to move along the guide rail 458 in directions indicated by the arrow Y (auxiliary scanning direction). The moving means 460 comprises a drive source 462, a drive pulley 464 fixedly mounted on the rotatable shaft of the drive source 462, a driven pulley 466 mounted in the casing 402 remotely from the drive pulley 464 in the auxiliary scanning direction, and an endless belt 408 bridging between the drive pulley 464 and the driven pulley 466. The reading head 432 is coupled to the endless belt 408.

The reading head 432 applies a line of stimulating light extending in the main scanning direction to the stimulable phosphor panel 16, and converts stimulated light emitted from the stimulable phosphor panel 16 into an electric signal representative of recorded radiation image information with a photoelectric transducer such as a line sensor or the like. The stimulable phosphor panel 16 is fed by a feed means, not shown, into a reading area in the movable range of the reading head 432. An erasing unit 436 having erasing light sources 476 for applying erasing light to the stimulable phosphor panel 16 is disposed in the casing 402 near the endless belt 408 of the moving means 460.

A locking jig loader 404 for being loaded with the movable part locking jig 60 (supply unit locking jig) is disposed on an upper wall of the casing 402 of the radiation image forming apparatus 400. The locking jig loader 404 has on its upper panel an operation/display unit 406 for operating the radiation image forming apparatus 400 and displaying necessary information. Wheels 56a, 56b for moving the radiation image forming apparatus 400 and stoppers 58a, 58b for supporting the moving the radiation image forming apparatus 400 are mounted on a lower wall of the casing 402.

The radiation image forming apparatus 400 reads radiation image information recorded in the stimulable phosphor panel 16 as follows: A shutter 422 is opened, and a cassette 18 or 18a housing the stimulable phosphor panel 16 therein is loaded into a cassette loader 425 in the upper wall of the casing 402. The stimulable phosphor panel 16 is removed from the cassette 18 or 18a and fed into the reading area. Thereafter, while the reading head 432 is being moved in the auxiliary scanning direction represented by the arrow Y by the moving means 460, the reading head 432 reads the recorded radiation image information from the stimulable phosphor panel 16. After the recorded radiation image information is read from the stimulable phosphor panel 16, the erasing unit 436 is energized to apply erasing light to the stimulable phosphor panel 16 thereby to erase residual radiation image information from the stimulable phosphor panel 16.

While the recorded radiation image information is being read from the stimulable phosphor panel 16 or the residual radiation image information is being erased from the stimulable phosphor panel 16, the movable part locking jig 60 may be loaded in the locking jig loader 404 on the upper wall of the casing 402, and the upper surface of the movable part locking jig 60 may be used as a working table, as indicated by the imaginary lines in FIG. 13. At this time, the movable part locking jig 60 may be locked in position by the casing locking member 76a, 76b engaging with the engaging recesses 86a, 86b (see FIG. 3) which are disposed in the locking jig loader 404.

For moving the radiation image forming apparatus 400 to another location, the operator removes the movable part locking jig 60 from the locking jig loader 404, and loads the movable part locking jig 60, instead of the cassette 18 or 18a, into the cassette loader 425, as shown in FIG. 13. Then, the reading head 432 is moved toward the cassette loader 425 by the moving means 460, and the operator moves the lever 62 to project the movable part locking members 80a through 80c to bring them into pressing engagement with a casing of the reading head 432, thereby locking the reading head 432 in position against movement. At this time, the casing locking members 76a, 76b engage respectively in other engaging recesses 86a, 86b (see FIG. 3) which are disposed in the cassette loader 425. In this manner, the movable part locking jig 60 is locked in the cassette loader 425. The operator may grips the grip 68 of the movable part locking jig 60 (see FIG. 3), tilts the radiation image forming apparatus 400 to be supported on the wheels 56a, 56b, and pulls the radiation image forming apparatus 400 to the desired location.

In the above embodiments, the movable part locking members 80a through 80c or 340a through 340c are pressed against the suction cups 30a through 30c or the reading head 432 to lock the suction cups 30a through 30c or the reading head 432 in position. However, the movable part locking members 80a through 80c or 340a through 340c may be pressed against a portion of a member for actuating the suction cups 30a through 30c or the reading head 432 to lock the suction cups 30a through 30c or the reading head 432 in position.

If the radiation image forming apparatus 10, 400 are so light that they can easily be carried around, then the wheels 56a, 56b and the stoppers 58a, 58b may be dispensed with. The radiation image forming apparatus 10, 400 may be modified such that they are free of the locking jig loaders 14b, 404 for loading the movable part locking jig 60.

The image forming apparatus incorporating the movable part locking jig therein is not limited to an apparatus for reading image information from an image recording medium, but may be an apparatus for recording image information in an image recording medium.

Although certain preferred embodiments of the present invention have been shown and described in detail, it should be understood that various changes and modifications may be made therein without departing from the scope of the appended claims.

What is claimed is:

1. A movable part locking jig for locking a movable part in an image forming apparatus for reading image information from an image recording medium or recording image information in an image recording medium, comprising:
   a casing for being loaded into a loader of the image forming apparatus which is loaded with the image recording medium;

a movable part locking member disposed in said casing for being displaced toward said movable part disposed near said loader into abutment against or engagement with said movable part to lock said movable part in position; and displacing means disposed in said casing for displacing said movable part locking member to said movable part.

2. A movable part locking jig according to claim 1, wherein said casing has a casing locking member for locking said casing in said loader; and said displacing means displaces said casing locking member to an engaging member disposed in said loader to lock said casing.

3. A movable part locking jig according to claim 2, wherein said displacing means comprises:

a displacing member for displacing said movable part locking member to said movable part and displacing said casing locking member to said engaging member; and an operating member disposed outside of said loader with said casing loaded therein, for displacing said displacing member.

4. A movable part locking jig according to claim 3, wherein said displacing member has a displacing member side tapered surface for engaging a locking member side tapered surface of said movable part locking member and displacing said movable part locking member in a direction substantially perpendicular to a direction in which said displacing member is displaced.

5. A movable part locking jig according to claim 3, wherein said casing locking member is pivotally supported on said casing by a shaft, and said displacing member presses a portion of said casing locking member which is spaced from said shaft to turn said casing locking member to said engaging member.

6. A movable part locking jig according to claim 3, wherein said casing locking member has a pinion pivotally supported on said casing, and said displacing member has a rack that extends in a direction in which said displacing member is displaced and that is held in mesh with said pinion, and wherein said displacing member turns said casing locking member to said engaging member through said rack and said pinion.

7. A movable part locking jig according to claim 2, wherein said displacing means has a solenoid mechanism for displacing said movable part locking member to said movable part and displacing said casing locking member to said engaging member.

8. A movable part locking jig according to claim 1, wherein said casing has a grip disposed outside of said loader when said casing is loaded in said loader, for moving said image forming apparatus with said casing.

9. A movable part locking jig according to claim 8, wherein said image forming apparatus incorporating said movable part fixing jig therein has wheels for moving said image forming apparatus.

10. A movable part locking jig according to claim 1, wherein said casing has a working table disposed outside of said image forming apparatus when said casing is incorporated in said image forming apparatus.

11. An image forming apparatus comprising a loader for being loaded with an image recording medium, an image processor for reading image information from said image recording medium or recording image information in said image recording medium, and a supply unit for holding and moving said image recording medium loaded in said loader to supply said image recording medium to said image processor;

wherein said loader is arranged to be loaded with a supply unit locking jig for displacing a supply unit locking member into abutment against or engagement with said supply unit to lock said supply unit in position.

12. An image forming apparatus according to claim 11, wherein said loader has an engaging member for being engaged with a locking member disposed on said supply unit locking jig which is loaded in said loader.

13. An image forming apparatus according to claim 11, further comprising a locking jig holder disposed independently of said loader, for holding said supply unit locking jig as loaded in said image forming apparatus.

14. An image forming apparatus according to claim 11, wherein said supply unit locking jig has a grip disposed at a position outside of said loader when said casing is loaded in said loader, for moving said image forming apparatus.

15. An image forming apparatus according to claim 14, further comprising wheels for moving said image forming apparatus.

16. An image forming apparatus according to claim 13, wherein said locking jig holder holds said supply unit locking jig which has a working table disposed outside of said image forming apparatus.

17. An image forming apparatus comprising a loader for being loaded with an image recording medium and an image processor movable in a scanning direction from said loader for reading image information from said image recording medium or recording image information in said image recording medium;

wherein said loader is arranged to be loaded with an supply unit locking jig for displacing an image processor locking member into abutment against or engagement with said image processor to lock said image processor in position.

18. An image forming apparatus according to claim 17, wherein said loader has an engaging member for being engaged with a locking member disposed on said supply unit locking jig which is loaded in said loader.

19. An image forming apparatus according to claim 17, further comprising a locking jig holder disposed independently of said loader, for holding said supply unit locking jig as loaded in said image forming apparatus.

20. An image forming apparatus according to claim 17, wherein said supply unit locking jig has a grip disposed at a position outside of said loader when said supply unit locking jig is loaded in said loader, for moving said image forming apparatus.

21. An image forming apparatus according to claim 20, further comprising wheels for moving said image forming apparatus.

22. An image forming apparatus according to claim 19, wherein said locking jig holder holds said supply unit locking jig which has a working table disposed outside of said image forming apparatus.

* * * * *